(12) United States Patent
Yamada

(10) Patent No.: US 11,316,996 B2
(45) Date of Patent: Apr. 26, 2022

(54) IMAGE FORMING APPARATUS FOR CONVEYING AND READING DOCUMENT

(71) Applicant: KYOCERA Document Solutions Inc., Osaka (JP)

(72) Inventor: Yohei Yamada, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/105,696

(22) Filed: Nov. 27, 2020

(65) Prior Publication Data

US 2021/0160391 A1 May 27, 2021

(30) Foreign Application Priority Data

Nov. 27, 2019 (JP) .............................. JP2019-214455

(51) Int. Cl.
*H04N 1/04* (2006.01)
*H04N 1/00* (2006.01)

(52) U.S. Cl.
CPC ..... *H04N 1/00803* (2013.01); *H04N 1/00777* (2013.01); *H04N 1/00816* (2013.01)

(58) Field of Classification Search
None
See application file for complete search history.

(56) References Cited

U.S. PATENT DOCUMENTS

| | | | | |
|---|---|---|---|---|
| 7,190,480 B2* | 3/2007 | Sturgeon | ............ | H04N 1/00002 358/1.17 |
| 7,362,455 B2* | 4/2008 | Xiong | ................ | H04N 1/00013 358/1.13 |
| 8,643,919 B2* | 2/2014 | Saida | ................ | H04N 1/00628 399/70 |
| 8,675,225 B2* | 3/2014 | Doi | ....................... | G03G 15/607 358/1.15 |
| 2007/0090586 A1* | 4/2007 | Ohnishi | ............... | G03G 15/607 271/9.01 |
| 2007/0139707 A1* | 6/2007 | Takami | .............. | H04N 1/00442 358/1.15 |
| 2008/0114757 A1* | 5/2008 | Dejean | .................. | G06F 16/258 |
| 2018/0007222 A1* | 1/2018 | Yamada | ............... | H04N 1/0032 |
| 2021/0099582 A1* | 4/2021 | Arima | ................ | H04N 1/00037 |
| 2021/0195044 A1* | 6/2021 | Yamada | ............... | H04N 1/0057 |

FOREIGN PATENT DOCUMENTS

JP  2007-221246  8/2007

* cited by examiner

*Primary Examiner* — Dung D Tran
(74) *Attorney, Agent, or Firm* — Lex IP Meister, PLLC

(57) ABSTRACT

An image forming apparatus includes a document conveyance unit, an image reading unit, and a control unit that performs an area identification process for identifying, from among a plurality of specific areas in document image data, a specific area including an image corresponding to a page number. The control unit extracts, as reference image data, image data in the specific area identified in the area identification process from the reference document, extracts, as comparative image data, image data in the specific area identified in the area identification process from among a plurality of specific areas in the document image data of a comparative document having a reading order later than the reference document by an extraction interval number, and outputs a confirmation page including combined image data in which the reference image data and the comparative image data overlap. The extraction interval number is a prescribed integer multiple of 10.

5 Claims, 12 Drawing Sheets

FIG. 7

| PAGE NUMBER OF DOCUMENT | READING ORDER VALUE |
|---|---|
| NA | 1 |
| NA | 2 |
| 3 | 3 | ← REFERENCE DOCUMENT
| 4 | 4 |
| ⋮ | ⋮ |
| 13 | 13 | ← REFERENCE DOCUMENT
| 14 | 14 |
| ⋮ | ⋮ |
| 21 | 21 |
| 22 | 22 |
| 23 | 23 | ← REFERENCE DOCUMENT
| 24 | 24 |
| 25 | 25 |
| 26 | MISSING |
| 27 | 26 |
| 28 | 27 |
| 29 | 28 |
| 30 | 29 |
| 31 | 30 |
| 32 | 31 |
| 33 | 32 |
| 34 | 33 | ← REFERENCE DOCUMENT
| ⋮ | ⋮ |
| 39 | 38 |
| 40 | 39 |

CONFIRMATION IMAGE DATA

CONFIRMATION PAGE

COMBINED IMAGE DATA

IMAGE FORMING APPARATUS FOR CONVEYING AND READING DOCUMENT

INCORPORATION BY REFERENCE

This application is based upon, and claims the benefit of priority from, corresponding Japanese Patent Application No. 2019-214455 filed in the Japan Patent Office on Nov. 27, 2019, the entire contents of which are incorporated herein by reference.

BACKGROUND

The present disclosure relates to an image forming apparatus for conveying and reading a document.

An image forming apparatus for reading a document sometimes includes a document conveyance unit that automatically conveys a document toward a reading position. For example, if a plurality of documents are to be read, a document bundle (the plurality of documents) is set to the document conveyance unit. The document conveyance unit sequentially conveys a document in the set document bundle toward the reading position. The image forming apparatus sequentially reads a document conveyed to the reading position.

Here, in a job executed in a state where a document bundle is set to the document conveyance unit, multi feeding in which two or more documents are conveyed in an overlapping manner may occur. If such a multi feeding occurs, a failure occurs in reading a document (a page missing occurs). That is, the job ends in a state where not all documents set to the document conveyance unit are read.

SUMMARY

An image forming apparatus according to one aspect of the present disclosure includes a document conveyance unit configured to sequentially convey a document being set toward a reading position, an image reading unit configured to sequentially read the document conveyed to the reading position, a control unit configured to sequentially acquire document image data obtained as a result of which the image reading unit reads the document, and perform an area identification process for identifying, from among a plurality of specific areas in the acquired document image data, a specific area of the plurality of specific areas including an image corresponding to a page number added to the document; and an output unit. The control unit sets any one of the documents to a reference document, extracts, as reference image data, from among a plurality of the specific areas in the document image data of the reference document, image data in a specific area of the plurality of specific areas identified in the area identification process, extracts, as comparative image data, from among a plurality of the specific areas in the document image data of a comparative document being the document having a reading order in which the image reading unit reads the document, later than the reference document by a prescribed extraction interval number, image data in a specific area of the plurality of specific areas identified in the area identification process, generates data of a confirmation page including combined image data in which the reference image data and the comparative image data overlap, and causes the output unit to output the confirmation page. The extraction interval number is a prescribed integer multiple of 10.

BRIEF DESCRIPTION OF THE DRAWINGS

FIG. 7 is a table for describing documents set to reference documents in the page number confirmation process performed by the control unit of the multifunction peripheral according to an embodiment of the present disclosure;

DETAILED DESCRIPTION

An image forming apparatus according to an embodiment of the present disclosure will be described below by using a multifunction peripheral as an example.

Configuration of Multifunction Peripheral

Figure 1:
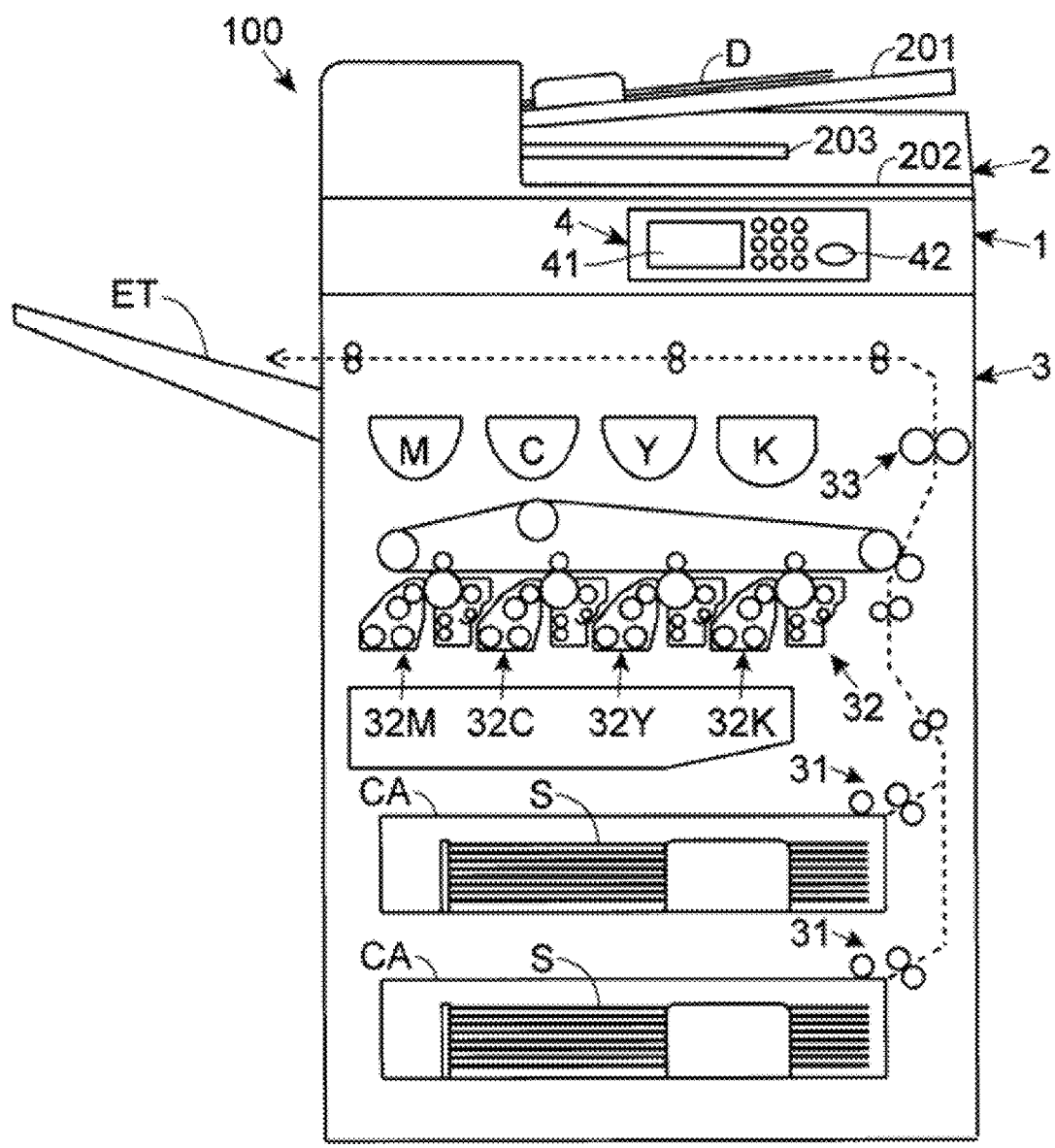
FIG. 1 is a schematic view illustrating an overall configuration of a multifunction peripheral according to an embodiment of the present disclosure.

As illustrated in FIG. 1, a multifunction peripheral 100 according to the present embodiment includes an image reading unit 1. A document conveyance unit 2 is arranged in a housing of the image reading unit 1. The document conveyance unit 2 corresponds to a "document conveyance unit".

Figure 2:
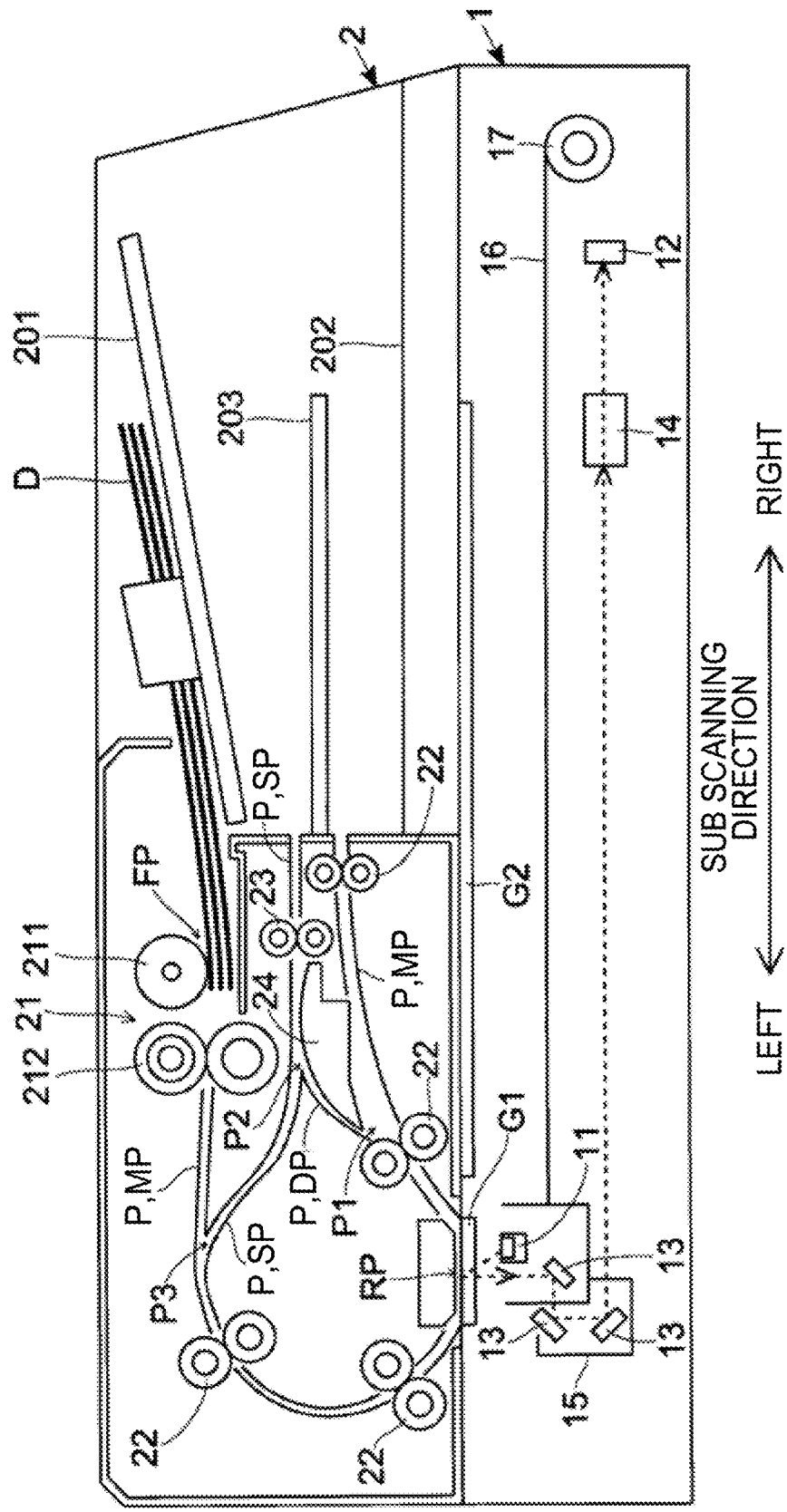
FIG. 2 is a diagram illustrating a configuration of an image reading unit and a document conveyance unit of the multifunction peripheral according to an embodiment of the present disclosure.

The image reading unit 1 and the document conveyance unit 2 have a configuration as illustrated in FIG. 2. The image reading unit 1 reads a document D and generates document image data corresponding to the read document D. The image reading unit 1 performs fed reading or stationary reading.

In the fed reading, the document D is automatically conveyed toward a contact glass G1 for fed reading, and when the document D passes over the contact glass G1, the document D is read by the image reading unit 1. In the stationary reading, the image reading unit 1 reads the document D placed on a contact glass G2 for stationary reading.

The image reading unit 1 includes a light source 11, an image sensor 12, a mirror 13, and a lens 14. The light source 11, the image sensor 12, the mirror 13, and the lens 14 are housed inside a housing of the image reading unit 1. The contact glasses G1 and G2 are arranged on an upper surface of the housing of the image reading unit 1.

The light source 11 includes a plurality of LED elements (not illustrated). The plurality of LED elements are arranged in a main scanning direction (direction perpendicular to a sheet surface in FIG. 2). In the fed reading, the light source 11 emits light toward the contact glass G1 (the document D on the contact glass G1 is irradiated with light transmitting through the contact glass G1). In the stationary reading, the light source 11 emits light toward the contact glass G2 (the document D on the contact glass G2 is irradiated with light transmitting through the contact glass G2). Reflected light reflected by the document D is reflected by the mirror 13 and guided to the lens 14. The lens 14 collects the reflected light.

The image sensor 12 includes a plurality of photoelectric conversion elements arranged in the main scanning direction. The image sensor 12 receives the light reflected by the document D (the light collected by the lens 14), performs photoelectric conversion for each pixel in each line, and accumulates electric charge. The image sensor 12 outputs data according to the accumulated electric charge.

The light source 11 and the mirror 13 are mounted on a carriage 15 movable in a sub scanning direction orthogonal to the main scanning direction. The carriage 15 is coupled to a wire 16. The wire 16 is wound around a winding drum 17. When the winding drum 17 rotates, the carriage 15 moves in the sub scanning direction. That is, the light source 11 and the mirror 13 move in the sub scanning direction.

In the fed reading, the document D is set to the document conveyance unit 2. The document conveyance unit 2 conveys the set document D toward a prescribed reading position RP. The reading position RP is a specific position on the contact glass G1.

Further, in the fed reading, the carriage 15 moves below the contact glass G1. Then, below the contact glass G1, the light source 11 irradiates the contact glass G1 with light. The image sensor 12 continuously and repeatedly performs photoelectric conversion of the reflected light reflected by the document D passing over the contact glass G1. Thus, the document D is read in each line.

In the stationary reading, the document D is placed on the contact glass G2, and in this state, the carriage 15 moves in the sub scanning direction (in a direction from left to right when viewed from the front of the device). When the carriage 15 moves in the sub scanning direction, the light source 11 emits light toward the contact glass G2. The image sensor 12 continuously and repeatedly performs photoelectric conversion of the reflected light reflected by the document D on the contact glass G2. Thus, the document D is read in each line.

The document conveyance unit 2 is pivotably supported with respect to the housing of the image reading unit 1. The document conveyance unit 2 opens and closes with respect to the upper surface of the housing (the contact glasses G1 and G2) of the image reading unit 1. The document conveyance unit 2 is opened and closed (pivoted) by a user.

The document conveyance unit 2 includes a document set tray 201. Further, the document conveyance unit 2 includes a document discharge tray 202. The document conveyance unit 2 conveys the document D set to the document set tray 201 toward the reading position RP. The document conveyance unit 2 discharges the document D which passes through the reading position RP (the document D read by the image reading unit 1) to the document discharge tray 202. The document conveyance unit 2 further includes a switchback tray 203 arranged above the document discharge tray 202.

The document conveyance unit 2 is provided with a document conveyance path P for conveying the document D. The document conveyance path P includes a main conveyance path MP, a switchback conveyance path SP, and a draw-in conveyance path DP.

The main conveyance path MP extends from the document set tray 201 to the document discharge tray 202 via the reading position RP. That is, the document D fed from the document set tray 201 to the main conveyance path MP is conveyed along the main conveyance path MP, and thus, the document D being conveyed passes through the reading position RP. When the document D fed from the document set tray 201 to the main conveyance path MP passes through the reading position RP, a front surface of the document D (a surface of the document D facing upward in a state where the document D is set to the document set tray 201) faces the contact glass G1. Therefore, the front surface of the document D is read at the reading position RP.

The switchback conveyance path SP is a conveyance path for switching back the document D to return the document D to the main conveyance path MP. In other words, the switchback conveyance path SP is a conveyance path for reversing the orientation of the front and rear surfaces of the document D. The switchback conveyance path SP extends from the switchback tray 203 to a position upstream of the reading position RP of the main conveyance path MP in a document conveyance direction, and at the position, the switchback conveyance path SP joins the main conveyance path MP.

The draw-in conveyance path DP is a conveyance path for drawing the document D from the main conveyance path MP into the switchback conveyance path SP. In other words, the draw-in conveyance path DP is a coupling path coupling the main conveyance path MP and the switchback conveyance path SP. At a position downstream of the reading position RP of the main conveyance path MP in the document conveyance direction, the draw-in conveyance path DP branches from the main conveyance path MP and joins the switchback conveyance path SP.

In the description below, reference numeral P1 refers to a branching position between the main conveyance path MP and the draw-in conveyance path DP, reference numeral P2 refers to a joining position of the draw-in conveyance path DP and the switchback conveyance path SP, and reference numeral P3 refers to a joining position of the switchback conveyance path SP and the main conveyance path MP.

The document conveyance unit 2 includes a sheet feed mechanism 21. The sheet feed mechanism 21 draws the document D set to the document set tray 201 out from the document set tray 201 and feeds the document D into the main conveyance path MP. The configuration of the sheet feed mechanism 21 is not particularly limited.

For example, the sheet feed mechanism 21 includes a pickup roller 211 and a sheet feed roller pair 212. The pickup roller 211 abuts against the document D set to the document set tray 201 at a prescribed sheet feed position FP. The pickup roller 211 rotates in a state where the pickup roller 211 abuts against the document D. Thus, the document D is drawn out from the document set tray 201. The sheet feed roller pair 212 feeds the document D drawn out from the document set tray 201 to the main conveyance path MP.

Further, the document conveyance unit 2 includes a conveyance roller pair 22, a reversing roller pair 23, and a switching claw 24.

A plurality of the conveyance roller pairs 22 are arranged in the main conveyance path MP. The plurality of conveyance roller pairs 22 conveys the document D along the main conveyance path MP.

The reversing roller pair 23 is arranged in the switchback conveyance path SP. The reversing roller pair 23 reverses the front and rear of the document D drawn into the switchback conveyance path SP in the conveyance direction. The reversing roller pair 23 switches between forward and reverse rotation.

The switching claw 24 is pivotably arranged at the branching position P1. The switching claw 24 switches the conveyance path of the document D at the branching position P1. The switching claw 24 pivots between a closed position where the document conveyance path from the branching position P1 to the draw-in conveyance path DP is closed and an opened position where the document conveyance path from the branching position P1 to the draw-in conveyance path DP is opened.

When double-sided reading is executed, the document conveyance unit 2 reverses the orientation of the front and rear surfaces of the document D. When the orientation of the front and rear surfaces of the document D is reversed, the switching claw 24 pivots toward the opened position. The reversing roller pair 23 rotates in a forward direction (rotates in a direction in which the document D is conveyed toward the switchback tray 203). Thus, the document D being conveyed (the document D that reaches the reading position RP) enters the draw-in conveyance path DP from the branching position P1. Then, the document D that enters the draw-in conveyance path DP is drawn into the switchback conveyance path SP from the joining position P2.

The reversing roller pair 23 rotates in the reverse direction after a rear end of the document D in the conveyance direction passes through the joining position P2 and before the rear end of the document D in the conveyance direction passes completely through a nip of the reversing roller pair 23. That is, the reversing roller pair 23 switches back the document D and conveys the switched back document D along the switchback conveyance path SP.

The document D conveyed along the switchback conveyance path SP returns from the joining position P3 to the main conveyance path MP and reaches the reading position RP. At this time, the orientation of the front and rear surfaces of the document D is reversed. That is, the rear surface of the document D (the surface facing downward in a state where the document D is set to the document set tray 201) faces the contact glass G1. Thus, it is possible to read the rear surface of the document D at the reading position RP.

Returning to FIG. 1, the multifunction peripheral 100 includes a print unit 3. The print unit 3 conveys a sheet S. Then, the print unit 3 prints an image on the sheet S being conveyed. In a copy job, an image based on document image data obtained as a result of which the image reading unit 1 reads the document D is printed on the sheet S by the print unit 3.

The print unit 3 includes a sheet feed unit 31, an image forming unit 32, and a fixing unit 33. The sheet feed unit 31 feeds the sheet S housed in a cassette CA into a sheet conveyance path (indicated by a broken line in FIG. 1). The sheet S fed into the sheet conveyance path is conveyed along the sheet conveyance path.

The image forming unit 32 includes a plurality of mechanism units 32K, 32Y, 32C, and 32M corresponding to each color of black (K), yellow (Y), cyan (C), and magenta (M). The mechanism units 32K, 32Y, 32C, and 32M each form a toner image having corresponding colors and primarily transfer the toner image to an intermediate belt. The toner image transferred to the intermediate belt is secondarily transferred to the sheet S being conveyed.

The fixing unit 33 applies pressure and heat to the sheet S to which the toner image is transferred. Thus, the toner image is fixed to the sheet S. The sheet S to which the toner image is fixed is conveyed along the sheet conveyance path and discharged to a discharge tray ET.

The multifunction peripheral 100 includes an operation panel 4. The operation panel 4 is provided with a touch screen 41. The touch screen 41 displays a screen on which a software button is arranged, and receives a setting (touch operation) from a user. Further, the operation panel 4 is provided with a plurality of hardware buttons 42. The hardware buttons 42 include a start button for receiving a job execution instruction from a user.

Figure 3:
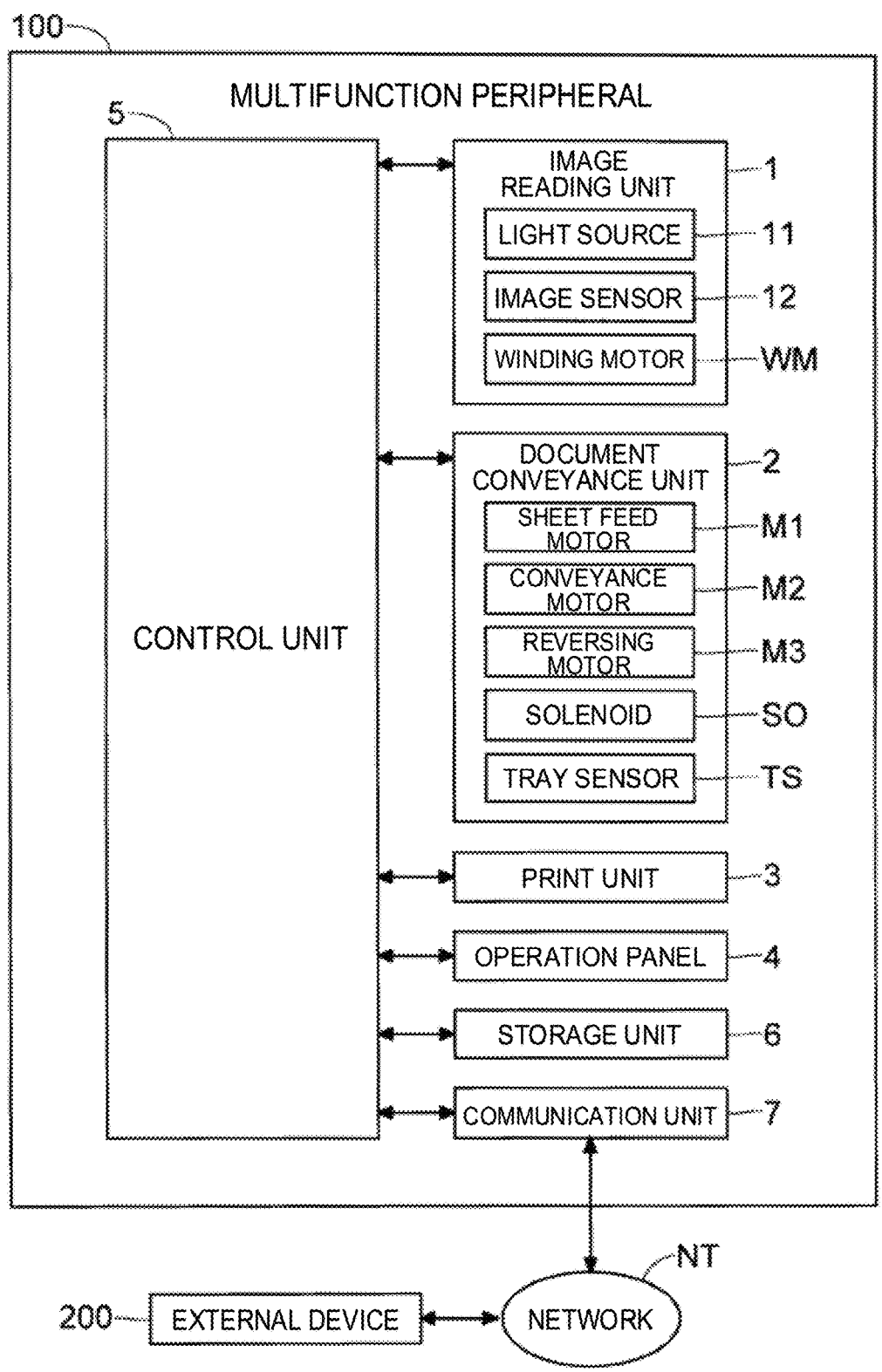
FIG. 3 is a block diagram illustrating a configuration of the multifunction peripheral according to an embodiment of the present disclosure.

Further, as illustrated in FIG. 3, the multifunction peripheral 100 includes a control unit 5. The control unit 5 includes a CPU. The control unit 5 controls the multifunction peripheral 100, based on a control program.

The multifunction peripheral 100 includes a storage unit 6. The storage unit 6 includes a non-volatile memory and a volatile memory. The storage unit 6 stores a control program. Further, the storage unit 6 stores document image data obtained as a result of which the image reading unit 1 reads a document.

The multifunction peripheral 100 includes a communication unit 7. The communication unit 7 includes a communication circuit and the like. The communication unit 7 is connected to a network NT such as a LAN. An external device 200 such as a user terminal (personal computer) and a server is connected to the network NT.

The control unit 5 controls the image reading unit 1. The control unit 5 is connected to the light source 11 and controls an on/off operation of the light source 11. The control unit 5 is connected to the image sensor 12 and controls a document reading operation of the image sensor 12. The control unit 5 is connected to a winding motor WM for rotating the winding drum 17, and controls the winding motor WM.

The control unit 5 performs an image process on the document image data obtained as a result of which the image reading unit 1 reads the document D. For example, the control unit 5 is provided with an image processing circuit (an ASIC or the like) for performing the image process. The control unit 5 performs the image process on the document image data and generates data for outputting the document image data obtained after the image process. Data for printing, on the sheet S, an image based on the document image data obtained after the image process is generated in a copy job. Data (PDF data and the like) for transmitting, to the external device 200, the document image data obtained after the image process is generated in a transmission job.

The control unit 5 controls a document conveyance operation of the document conveyance unit 2. The control unit 5 is connected to a sheet feed motor M1 for rotating the sheet feed mechanism 21 (the pickup roller 211 and the sheet feed roller pair 212), a conveyance motor M2 for rotating the conveyance roller pair 22, and a reversing motor M3 for rotating the reversing roller pair 23. The control unit 5 is connected to a solenoid SO for pivoting the switching claw 24. The control unit 5 controls the sheet feed motor M1, the conveyance motor M2, the reversing motor M3, and the solenoid SO.

Here, if a document bundle is set to the document set tray 201, the document conveyance unit 2 successively feeds and conveys the document D one by one from documents in the uppermost layer in the document bundle to the document conveyance path P. The image reading unit 1 sequentially reads the document D conveyed to the reading position RP.

For example, the document set tray 201 is provided with a lift plate (not illustrated). The lift plate is positioned below the document D set to the document set tray 201. The lift plate rises upward to lift the document bundle.

The control unit 5 controls raising and lowering of the lift plate. When the control unit 5 causes the document conveyance unit 2 to feed (feed and convey) documents of a document bundle set to the document set tray 201, the control unit 5 raises the lift plate so that the document D in the uppermost layer in the document bundle abuts against the pickup roller 211.

The control unit 5 rotates the pickup roller 211 in a state where the document D abuts against the pickup roller 211. Thus, the document D is drawn out from the document set tray 201. That is, the document D is fed into the document conveyance path P.

Further, the control unit 5 releases the coupling between the pickup roller 211 and the sheet feed motor M1 before the document D being fed leaves the sheet feed position FP (the pickup roller 211 is released into a free state). After the document D leaves the sheet feed position FP, the control unit 5 rotates the pickup roller 211 again to feed the next document D. Further, the control unit 5 raises the lift plate and maintains the state where the document D abuts against the pickup roller 211.

A tray sensor TS is connected to the control unit 5. The tray sensor TS is a transmission-type optical sensor including a light emitting unit and a light receiving unit. A sensing target of the tray sensor TS is an actuator (not illustrated). The actuator is arranged in the document set tray 201. When the document D is set to the document set tray 201, the actuator is pressed by the document D and moves downward to block (or open) the optical path of the tray sensor TS (between the light emitting unit and the light receiving unit). When the document D is not on the document set tray 201 any more, the pressure from the document D is released and the actuator moves upward to open (or block) the optical path of the tray sensor TS.

Thus, the tray sensor TS changes an output value depending on whether the document D is set to the document set tray 201. Based on the output value of the tray sensor TS, the control unit 5 determines whether the document D is set to the document set tray 201.

The control unit 5 controls the print unit 3. For example, if a job to be executed is a copy job, the control unit 5 generates exposure control data (data for controlling an exposure process), based on the document image data obtained after the image process, and outputs the exposure control data to the print unit 3. The print unit 3 develops an electrostatic latent image formed based on the exposure control data into a toner image. Then, the print unit 3 transfers the toner image to the sheet S being conveyed.

The control unit 5 is connected to the operation panel 4. The control unit 5 controls a display operation of the operation panel 4. Further, the control unit 5 senses an operation performed on the operation panel 4. The operation panel 4 receives, from a user, a setting related to a page number confirmation function described later.

The control unit 5 is connected to the communication unit 7. The control unit 5 communicates (transmits and receives data) with the external device 200 via the communication unit 7. When a transmission job is executed, the control unit 5 transmits output data (such as PDF data) generated based on the document image data obtained after the image process, to the external device 200 via the communication unit 7.

Page Number Confirmation Function

In a job accompanying fed reading, a document bundle is often set to the document set tray 201. If a document bundle is set to the document set tray 201, multi feeding in which a plurality of documents D are fed and conveyed in an overlapping manner to the document conveyance path P may occur.

Figure 4:
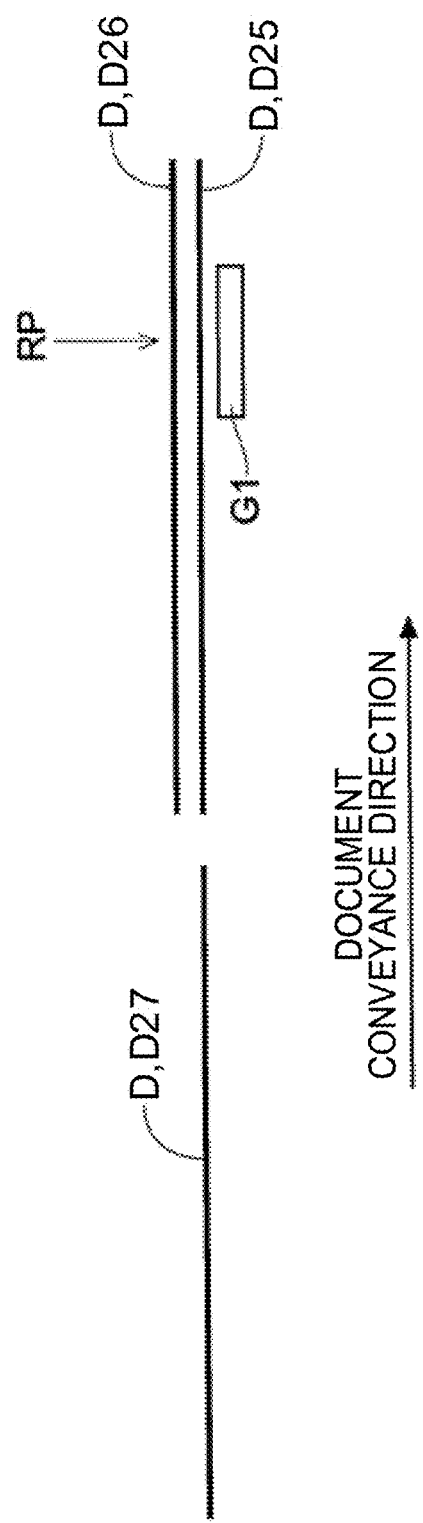
FIG. 4 is a diagram for describing multi feeding that may occur in the multifunction peripheral according to an embodiment of the present disclosure.

For example, it is assumed that multi feeding in which the document D of the 26th page (the document D with the page number "26") is conveyed in an overlapping manner with the document D of the 25th page (the document D with the page number "25") occurs. If such multi feeding occurs, after reading the document D of the 25th page, the document D of the 27th page (the document D with the page number "27") is read, but the document D of the 26th page is not read. This is because, in the state illustrated in FIG. 4, the document D of the 25th page (referred to by reference numeral D25 in FIG. 4), the document D of the 26th page (referred to by reference numeral D26 in FIG. 4), and the document D of the 27th page (referred to by reference numeral D27 in FIG. 4) are conveyed. In other words, when the document D of the 25th page is fed into the document conveyance path P, the document D of the 26th page is not separated from the document D of the 25th page.

As a result, if a job to be executed is a copy job, after the sheet S on which an image of the document D of the 24th page (the document D with the page number "24") is printed is output, the sheet S on which an image of the document D of the 25th page is printed and the sheet S on which an image of the document D of the 27th page is printed are output in this order. That is, the 26th page is missing (a page missing occurs).

For example, if the multifunction peripheral 100 is equipped with a multi feeding sensing unit (a sensor for sensing multi feeding), the job is interrupted when the multi feeding sensing unit senses multi feeding. However, even if multi feeding occurs, the multi feeding sensing unit may not sense the multi feeding. That is, false sensing may occur. In this case, the job continues even though multi feeding occurs. As a result, a page missing occurs.

Therefore, after the plurality of documents D are read, some users perform a task of confirming whether there is a missing page. If the number of documents to be read is small, the confirming task is easy. However, if the number of documents to be read is large, the confirming task is difficult and troublesome for the users.

Therefore, the multifunction peripheral 100 is equipped with a page number confirmation function. If the page number confirmation function is used, the task for confirming a missing page is easy.

A user can freely select whether to enable the page number confirmation function. The operation panel 4 receives a setting for enabling/disabling the page number confirmation function from the user. If the operation panel 4 receives a setting for enabling the page number confirmation function, the control unit 5 enables the page number confirmation function.

The control unit 5 starts a job if the operation panel 4 receives an instruction for executing a job accompanying fed reading. If sensing an operation on the start button of the operation panel 4 in a state where the document D is set to the document set tray 201, the control unit 5 determines that an instruction for executing a job accompanying fed reading is received.

If receiving an instruction for executing a job accompanying fed reading, the control unit 5 starts fed reading by the image reading unit 1. When executing the job accompanying fed reading, the document conveyance unit 2 sequentially conveys the documents D of the document bundle set to the document set tray 201 toward the reading position RP. The image reading unit 1 sequentially reads the documents D conveyed to the reading position RP. The control unit 5 sequentially acquires document image data obtained in reading the documents D.

Here, if the page number confirmation function is enabled, the control unit 5 performs a process related to the page number confirmation function (hereinafter, referred to as page number confirmation process). For example, the control unit 5 performs the page number confirmation process after the reading of the document D by the image reading unit 1 is completed (when the document D is not on the document set tray 201 any more) and before the document image data is outputted. If a job to be executed is a copy job, the page number confirmation process may be performed in parallel with outputting the document image data (printing of the image onto the sheet S, based on the document image data).

Figure 5:
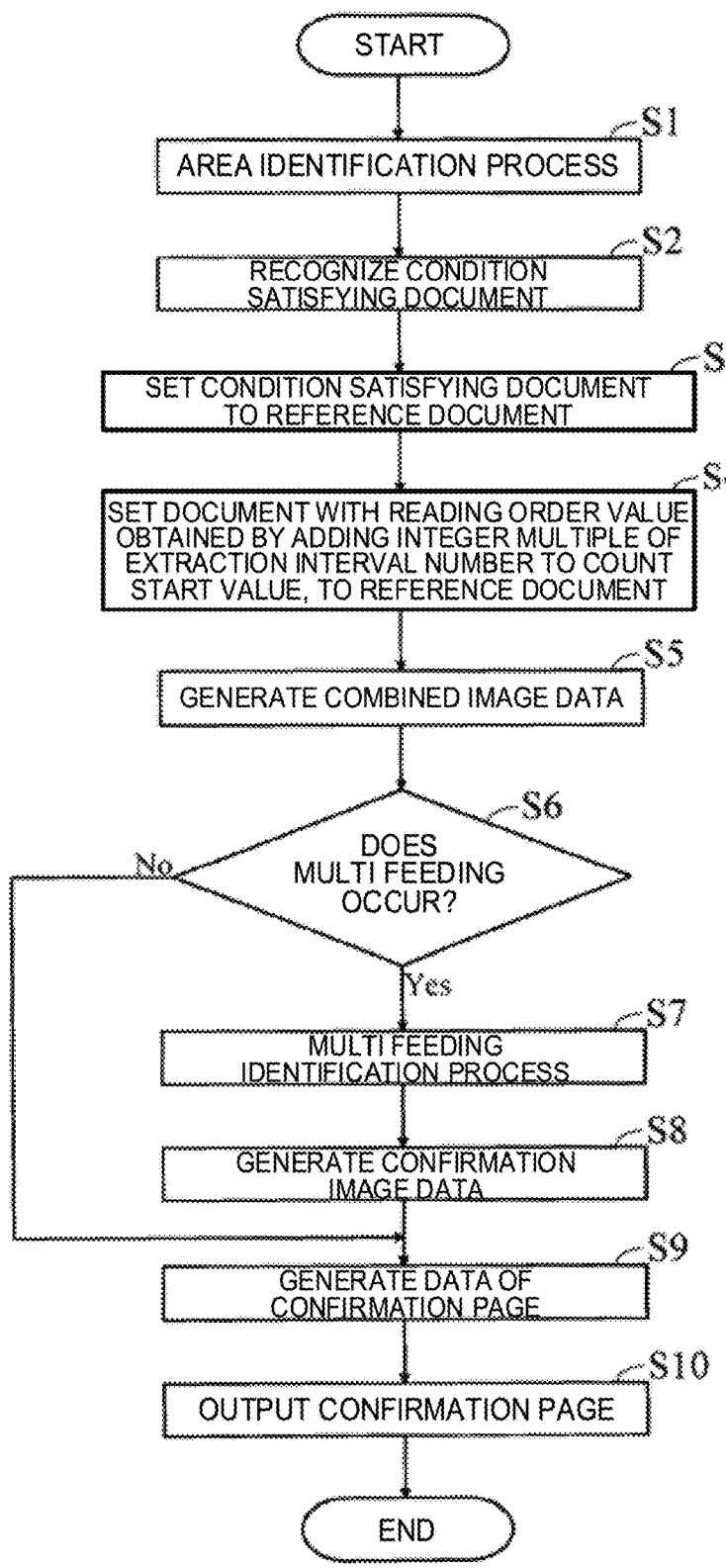
FIG. 5 is a diagram illustrating a flow of a page number confirmation process performed by a control unit of the multifunction peripheral according to an embodiment of the present disclosure.

A flow of the page number confirmation process performed by the control unit 5 will be described below with reference to the flowchart illustrated in FIG. 5. The flow illustrated in FIG. 5 starts when the control unit 5 determines that the reading of the document D by the image reading unit 1 is completed (the document D is not any more on the document set tray 201). That is, the control unit 5 performs the page number confirmation process after acquiring all pieces of document image data of the document D read by the image reading unit 1.

In step S1, the control unit 5 performs an area identification process for each piece of document image data. The control unit 5 performs the area identification process to identify a specific area including a page number image (an image corresponding to the page number of the document D) from a plurality of specific areas in the document image data.

When performing the area identification process, the control unit 5 binarizes the document image data to be processed in the area identification process. Then, the control unit 5 detects, from the document image data to be processed, a black pixel area formed by a group of a plurality of only black pixels. At this time, a labeling process may be performed.

Figure 6:
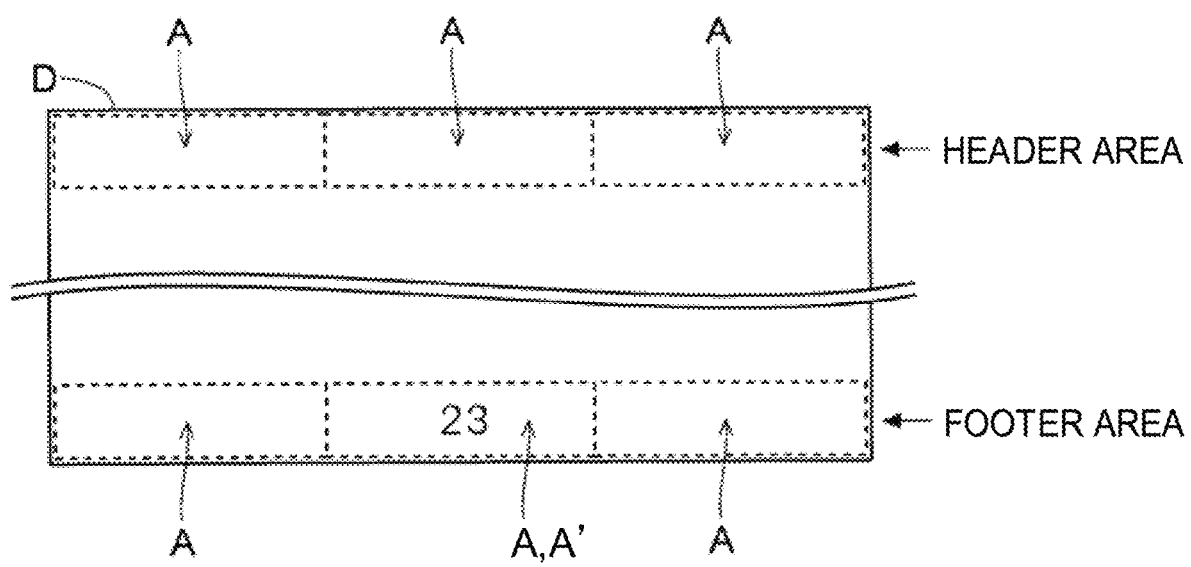
FIG. 6 is a diagram illustrating a header area and a footer area of a document to be read by the multifunction peripheral according to an embodiment of the present disclosure.

Further, the control unit 5 recognizes a plurality of specific areas in the document image data to be processed. For example, as illustrated in FIG. 6, a header area and a footer area in the document D are each divided into two or more areas A, and each area in the document image data corresponding to the plurality of areas A obtained as a result of which the header area and the footer area are divided is a specific area. Normally, a page number is added to the header area or the footer area in the document D. That is, each of the plurality of specific areas is an area in which a page number image corresponding to the page number added to the document D may exist. "23" written in an area A' in FIG. 6 is a page number added to the document D.

In the example illustrated in FIG. 6, the header area and the footer area in the document D are each divided into three areas A, so that the specific area includes six specific areas, but the number of specific areas is not particularly limited. For example, the specific area may include two areas, an area corresponding to the header area in the document D and an area corresponding to the footer area in the document D, in the document image data to be processed.

After recognizing a plurality of specific areas in the document image data to be processed, the control unit 5 determines whether there is a specific area including a page number image in the document image data to be processed. If a page number is added to the header area or the footer area in the document D corresponding to the document image data to be processed, a page number image appears in any one specific area in the document image data to be processed.

For example, in the example illustrated in FIG. 6, a page number is added to the area A' in the footer area in the document D, and a page number is not added to the other areas A. In this case, from among the plurality of specific areas in the document image data to be processed, a black pixel area appears in the specific area corresponding to the area A', but a black pixel area does not appear in the specific areas corresponding to the other areas A.

Therefore, the control unit 5 determines whether there is a black pixel area in each of the plurality of specific areas in the document image data to be processed. Then, the control unit 5 determines that a specific area including a black pixel area in the area is a specific area including a page number image.

Returning to FIG. 5, in step S2, the control unit 5 recognizes a condition satisfying document satisfying a specific condition from among the plurality of documents D read by the image reading unit 1. In other words, the control unit 5 recognizes document image data of the condition satisfying document.

Specifically, the control unit 5 first determines whether a specific area including the page number image is included in document image data of the document D first read by the image reading unit 1 (hereinafter referred to as the first document D). The control unit 5 determines that the first document D is a condition satisfying document if a specific area including the page number image is included in the document image data of the first document D.

If the first document D is not a condition satisfying document, the control unit 5 determines whether a specific area including a page number image is included in document image data of the document D read secondly by the image reading unit 1 (hereinafter, the second document D). The control unit 5 determines that the second document D is a condition satisfying document if a specific area including a page number image is included in the document image data of the second document D.

If the second document D is not a condition satisfying document, the control unit 5 determines whether the document D read thirdly or later by the image reading unit 1 is a condition satisfying document. The control unit 5 determines whether the document D read by the image reading unit 1 is a condition satisfying document in the reading order until a condition satisfying document is detected.

In step S3, the control unit 5 sets the document D first determined to be a condition satisfying document, to a reference. In the following description, the document D set to the reference is referred to as a reference document D. If the first document D is a condition satisfying document, the control unit 5 sets the first document D to the reference document D. If the first document D is not a condition satisfying document and the second document D is a condition satisfying document, the control unit 5 sets the second document D to the reference document D. If the second document D is not a condition satisfying document, the document D first determined to be a condition satisfying document by the control unit 5 from among the documents D read thirdly and later by the image reading unit 1, is set to the reference document D.

In step S4, the control unit 5 sets a reading order value of the document D determined to be a condition satisfying document, to a count start value. The reading order value is a value indicating an order in which the document D is read by the image reading unit 1. In addition to the document D determined to be a condition satisfying document, the control unit 5 also sets the document D in which the reading order value is a value obtained by adding an integer multiple of a prescribed extraction interval number to the count start value, to the reference document D.

The extraction interval number is preset by a manufacturer and stored in the storage unit 6. A number of an integer multiple of 10 is preset to the extraction interval number. For example, the extraction interval number is set to "10". The extraction interval number may be freely changed by a user. The operation panel 4 receives a change of the extraction interval number from a user.

In an example, it is assumed that the number of documents to be read is 40. Then, it is assumed that the third read document D is determined to be a condition satisfying document and is set to the reference document D (no page number is added to each of the first document D in the reading order and the second document D in the reading order). That is, it is assumed that the count start value is "3".

In this case, as shown in FIG. 7, in addition to the third read document D, the 13th (=3+10*1) read document D (the document D having a reading order value of "13"), the 23rd (=3+10*2) read document D (the document D having a reading order value of "23"), and the 33rd (=3+10*3) read document D (the document D having a reading order value of "33") are set to reference documents D.

Returning to FIG. 5, in step S5, the control unit 5 performs a combining process of generating combined image data. A specific description will be given below.

When performing the combining process, the control unit 5 selects any one of the reference documents D. Here, for convenience, the reference document D selected by the control unit 5 is referred to as a selected reference document D.

After selecting any one of the reference documents D, the control unit 5 extracts, as reference image data, image data in a specific area identified in the area identification process (a specific area including a page number image), from among a plurality of specific areas in the document image data of the selected reference document D. Further, the control unit 5 extracts, as comparative image data, image data in a specific area identified in the area identification process, from among a plurality of specific areas in the document image data of the document D having a reading order read by the image reading unit 1 that is later than the selected reference document D by the extraction interval number (hereinafter, referred to as a comparative document D).

Then, the control unit 5 generates, as the combined image data, image data obtained by superimposing the reference image data and the comparative image data. The sizes of the image data in the specific area extracted from each of the pieces of document image data are the same. That is, the sizes of the reference image data and the comparative image data are the same. Normally, the position of page number added to each of the documents D within the document D is the same. Therefore, when the reference image data and the comparative image data are superimposed, a part of page number images included in each of the image data overlap with each other.

After the combining process, the control unit 5 determines whether an unselected reference document D remains. If the unselected reference document D remains, the control unit 5 newly selects the unselected reference document D (the reference document D being selected is a new selected reference document D). Then, the control unit 5 performs the combining process again.

From among the plurality of reference documents D, the reference document D read last by the image reading unit 1 does not have a document D having an order in which the image reading unit 1 reads the document D later by the extraction interval number than the reference document D read last. That is, the combining process is not performed.

In the example shown in FIG. 7, the combining process is performed three times. Specifically, a process of combining each piece of image data corresponding to each of the document D having a reading order value "3" and the document D having a reading order value "13", a process of combining each piece of image data corresponding to each of the document D having a reading order value "13" and the document D having a reading order value "23", and a process of combining each piece of image data corresponding to each of the document D having a reading order value "23" and the document D having a reading order value "33" are performed. That is, three pieces of combined image data are generated.

The number of pieces of combined image data to be generated varies depending on the number of documents D read by the image reading unit 1. In some cases, a plurality of pieces of combined image data are generated, and in other cases, only one piece of combined image data is generated. The combined image data is not generated if the number of documents read after a document D next to the document D determined to be a condition satisfying document and set to a reference, does not reach the extraction interval number.

In step S6, the control unit 5 determines whether multi feeding occurs, based on the combined image data. A specific description will be given below with reference to FIGS. 8 and 9.

The control unit 5 recognizes, as a difference area, an area in the combined image data corresponding to an area in which an absolute value of a difference in pixel value between the reference image data and the comparative image data is equal to or greater than a specific value (the control unit 5 performs a difference recognition process). If a plurality of pieces of combined image data are generated, the control unit 5 performs the difference recognition process for each of the plurality of pieces of combined image data.

Figure 8:
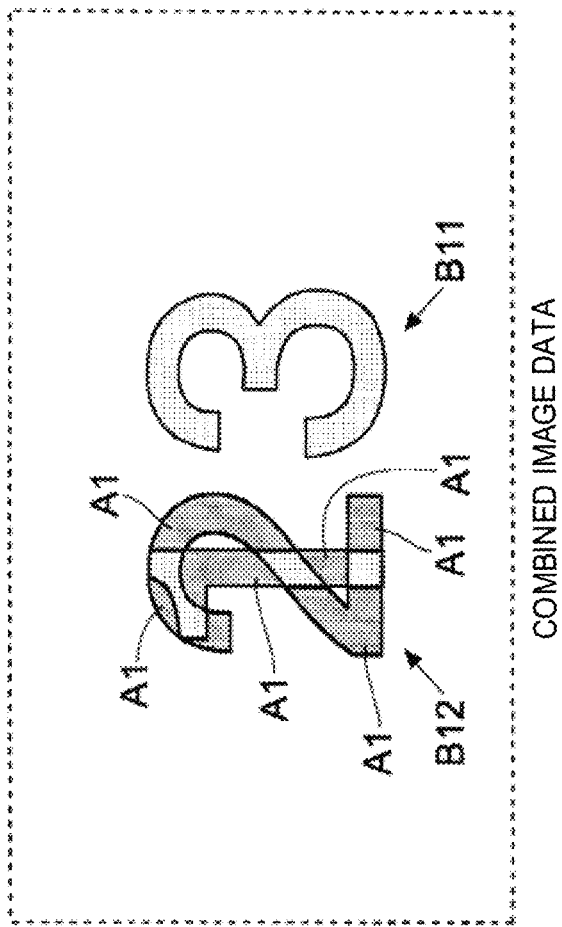
FIG. 8 is a diagram for describing combined image data generated in the page number confirmation process performed by the control unit of the multifunction peripheral according to an embodiment of the present disclosure.
Figure 8:
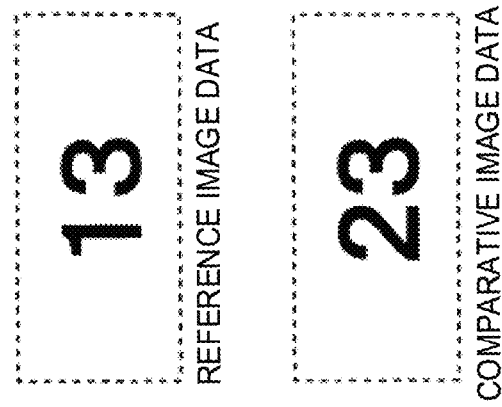

For example, it is assumed that the combined image data illustrated in the right figure of FIG. 8 is generated. The combined image data illustrated in the right figure of FIG. 8 is obtained by combining reference image data including a page number image corresponding to the page number "13" (see left figure of FIG. 8) and comparative image data including a page number image corresponding to the page number "23" (see left figure of FIG. 8). In FIG. 8, the size of the combined image data is enlarged for clarity of the representation. If the difference recognition process is performed on the combined image data illustrated in the right figure of FIG. 8, an area indicated by the reference numeral A1 (an area indicated by a darker color than the other areas) is recognized as a difference area in the combined image data.

Figure 9:
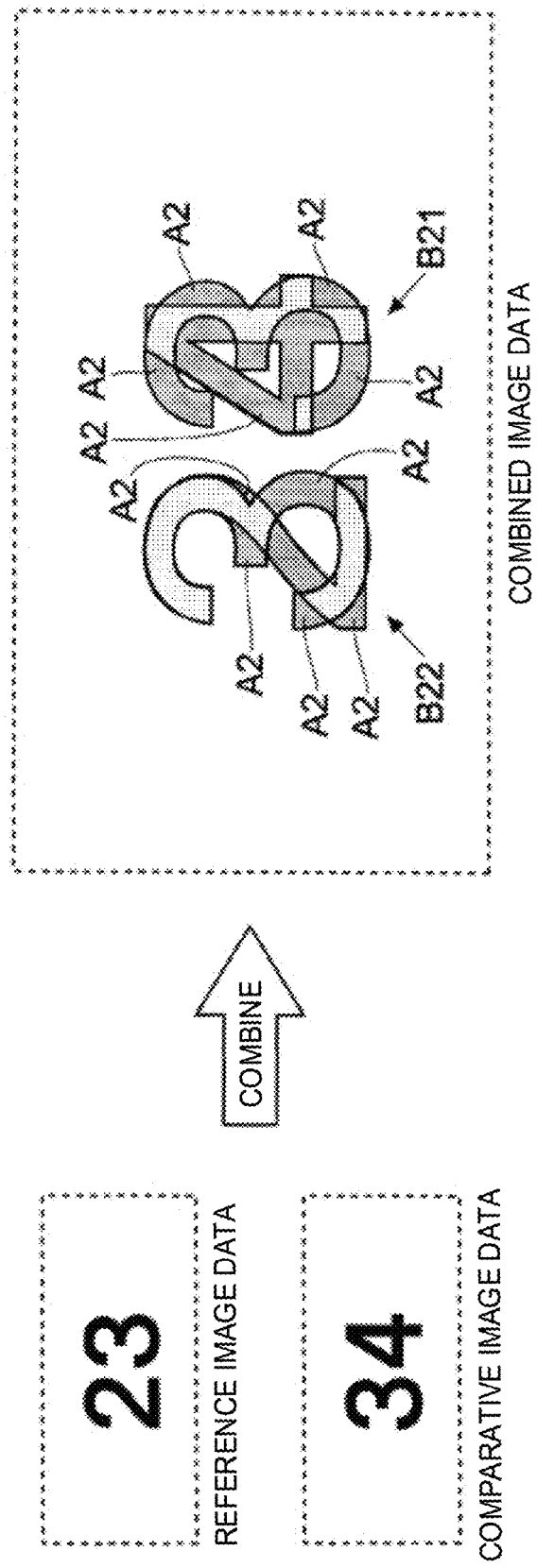
FIG. 9 is a diagram for describing combined image data generated in the page number confirmation process performed by the control unit of the multifunction peripheral according to an embodiment of the present disclosure.

Further, it is assumed that the combined image data illustrated in the right figure of FIG. 9 is generated. The combined image data illustrated in the right figure of FIG. 9 is obtained by combining reference image data including a page number image corresponding to the page number "23" (see left figure of FIG. 9) and comparative image data including a page number image corresponding to the page number "34" (see left figure of FIG. 9). If the difference recognition process is performed on the combined image data illustrated in the right figure of FIG. 9, an area indicated by the reference numeral A2 (an area indicated by a darker color than the other areas) is recognized as a difference area in the combined image data.

As illustrated in FIGS. 8 and 9, in the area corresponding to the page number image of the reference image data in the combined image data, an area recognized as a difference area is an area not overlapping with the page number image of the comparative image data. Further, in the area corresponding to the page number image of the comparative image data in the combined image data, an area recognized as a difference area is an area not overlapping with the page number image of the reference image data.

The control unit 5 performs a process (area detection process) of detecting, from the binarized combined image data, a black pixel area formed by a group of black pixels. If a plurality of pieces of combined image data are generated, the control unit 5 performs the area detection process for each of the plurality of pieces of combined image data.

For example, if the area detection process is performed on the combined image data illustrated in the right figure of FIG. 8, areas B11 and B12 are detected as black pixel areas. Further, if the area detection process is performed on the combined image data illustrated in the right figure of FIG. 9, areas B21 and B22 are detected as black pixel areas.

When the difference recognition process and the area detection process are completed, the control unit 5 counts (performs a counting process of) the number of pixels in the difference area in the black pixel area for each black pixel area in the combined image data. If a plurality of pieces of combined image data are generated, the control unit 5 performs the counting process for each of the plurality of pieces of combined image data.

The control unit 5 determines whether the combined image data includes a plurality of black pixel areas in which the number of pixels in the difference area is equal to or greater than a prescribed threshold value. Based on the result of the determination, the control unit 5 determines whether multi feeding occurs.

Here, in an example, it is assumed that a page number added to a document D (here, referred to by reference numeral D23) having a reading order later by the extraction interval number (=10) than the document D to which the page number "13" is added (here, referred to by reference numeral D13) is "23". That is, it is assumed that multi feeding does not occur during the reading from the document D13 to the document D23. In this case, the combined image data illustrated in the right figure of FIG. 8 is generated.

In the example illustrated in FIG. 8, the ones digits of the page numbers added to the documents D13 and D23 are both "3". Thus, a difference area does not appear in the black pixel area B11. Even if a difference area appears in the black pixel area B11, it is unlikely that the number of pixels in a difference area in the black pixel area B11 is equal to or greater than the threshold value.

In the example illustrated in FIG. 8, the tens digit of the page number added to the document D13 is "1", and the tens digit of the page number added to the document D23 is "2". Therefore, the difference area A1 appears in the black pixel area B12. The number of pixels in the difference area A1 is equal to or greater than the threshold value.

In another example, it is assumed that a page number added to a document D (here, referred to by reference numeral D34) having a reading order later by the extraction interval number (=10) than the document D to which the page number "23" is added (here, referred to by reference numeral D23) is "34". That is, it is assumed that multi feeding occurs during the reading from the document D23 to the document D24. In this case, the combined image data illustrated in the right figure of FIG. 9 is generated. For example, if multi feeding occurs in which the document D of the 26th page (the document D with the page number "26") overlaps with the document D of the 25th page (the document D with the page number "25"), the combined image data illustrated in the right figure of FIG. 9 is generated.

In the example illustrated in FIG. 9, the ones digit of the page number added to the document D23 is "3", and the ones digit of the page number added to the document D34 is "4". Therefore, the difference area A2 appears in the black pixel area B21. The number of pixels in the difference area A2 in the black pixel area B21 is equal to or greater than the threshold value.

In the example illustrated in FIG. 9, the tens digit of the page number added to the document D23 is "2", and the tens digit of the page number added to the document D34 is "3". Therefore, the difference area A2 appears in the black pixel area B22. The number of pixels in the difference area A2 in the black pixel area B22 is equal to or greater than the threshold value.

As illustrated in FIGS. 8 and 9, if multi feeding does not occur, one black pixel area in which the number of pixels in the difference area is equal to or greater than the threshold value appears in the combined image data. On the other hand, if multi feeding occurs, a plurality of black pixel areas in which the number of pixels in the difference area is equal to or greater than the threshold value appear in the combined image data.

Therefore, the control unit 5 determines that multi feeding occurs if the combined image data includes a plurality of black pixel areas in which the number of pixels in the difference area is equal to or greater than the threshold value. On the other hand, the control unit 5 determines that multi feeding does not occur if the combined image data includes only one black pixel area in which the number of pixels in the difference area is equal to or greater than the threshold value.

Returning to FIG. 5, if the control unit 5 determines that multi feeding occurs in step S6, the process proceeds to step S7. If a plurality of pieces of combined image data are generated, if any one of the pieces of combined image data includes a plurality of black pixel areas in which the number of pixels in the difference area is equal to or greater than the threshold value, the process proceeds to step S7.

If the process proceeds to step S7, the control unit 5 performs a multi feeding identification process of identifying when the multi feeding occurs. In the multi feeding identification process, the control unit 5 targets combined image data including a plurality of black pixel areas in which the number of pixels in the difference area is equal to or greater than the threshold value. For example, even if the combined image data illustrated in the right figure of FIG. 8 is generated, the multi feeding identification process on the combined image data is not performed. If the combined image data illustrated in the right figure of FIG. 9 is generated, the multi feeding identification process on the combined image data is performed.

When performing the multi feeding identification process, the control unit 5 sets, to confirmation targets, all of the documents D read by the image reading unit 1 from a reading of the reference document D corresponding to reference image data combined when the combined image data to be processed is generated until a reading of the comparative document D corresponding to comparative image data combined when the combined image data to be processed is generated. Then, the control unit 5 determines that multi feeding occurs during conveyance of the document D being a confirmation target.

In step S8, the control unit 5 extracts image data in a specific area (an area including the page number image) identified in the area identification process from each piece of document image data obtained by reading the document D being a confirmation target. Then, the control unit 5 generates confirmation image data in which image data in the specific area extracted from each piece of document image data obtained by reading the document D being a confirmation target, is arranged.

For example, it is assumed that the multi feeding identification process is performed on the combined image data illustrated in the right figure of FIG. 9. In the example illustrated in FIG. 9, multi feeding occurs in a period from the reading of the document D with the page number "23" to the reading of the document D with the page number "34".

Figure 10:
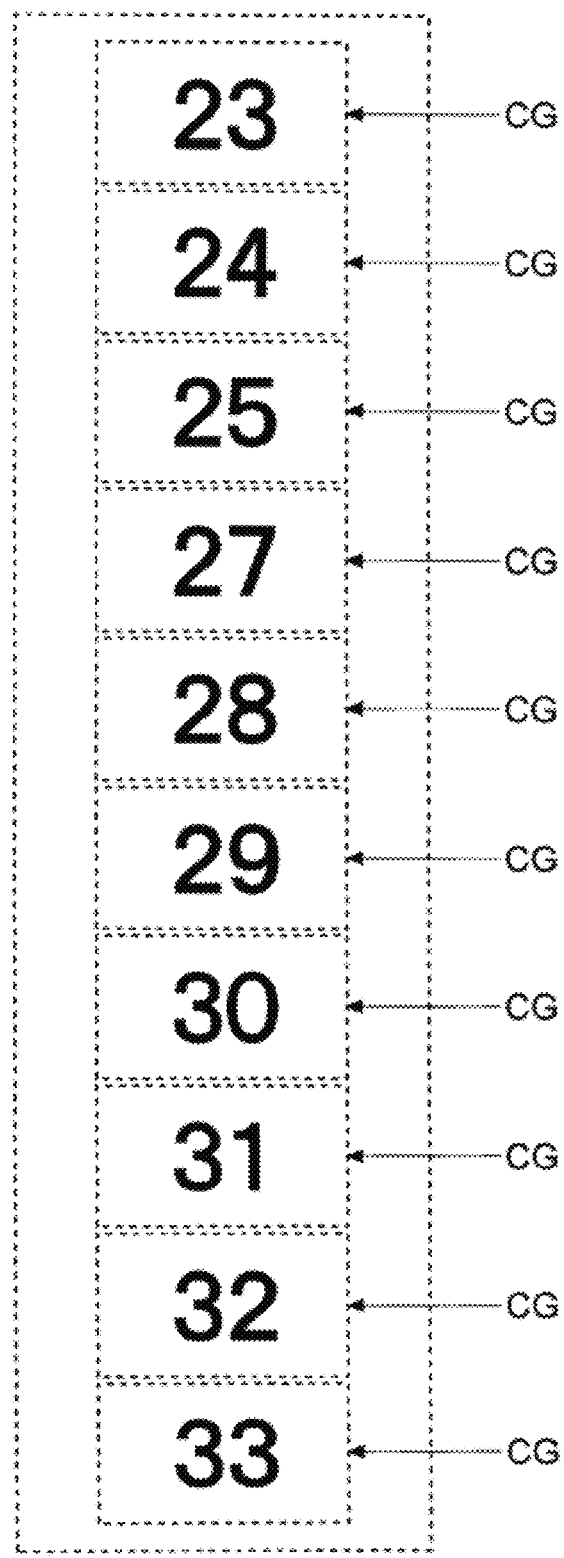
FIG. 10 is a diagram for describing confirmation image data generated in the page number confirmation process performed by the control unit of the multifunction peripheral according to an embodiment of the present disclosure.

If the multi feeding identification process is performed on the combined image data illustrated in the right figure of FIG. 9, image data in the specific area identified in the area identification process is extracted from each piece of document image data obtained in a period from the reading of the document D with the page number "23" to the reading of the document D with the page number "34". As a result, confirmation image data as illustrated in FIG. 10 is generated. In FIG. 10, reference numerals CG refer to each piece of image data in a specific area extracted from each piece of document image data. For example, the pieces of image data in the specific areas extracted from each of the pieces of document image data are arranged in a row in the reading order.

Returning to FIG. 5, after the confirmation image data is generated, the process proceeds to step S9. If the control unit 5 determines in step S6 that multi feeding does not occurs, the processes of steps S7 and S8 are omitted, and the process proceeds to step S9.

In step S9, the control unit 5 generates data of a confirmation page including the combined image data. If a plurality of pieces of combined image data are generated, the control unit 5 generates a confirmation page in which the plurality of pieces of combined image data are put together into one page. If the process proceeds from step S6 to step S9 via steps S7 and S8, the control unit 5 performs control so that the confirmation image data is included into the confirmation page.

For example, it is assumed that the page number of the document D determined to be a condition satisfying document and set to a reference, is "13". Further, it is assumed that multi feeding in which the document D with the page number "26" overlaps with the document D with the page number "25", occurs.

Figure 11:
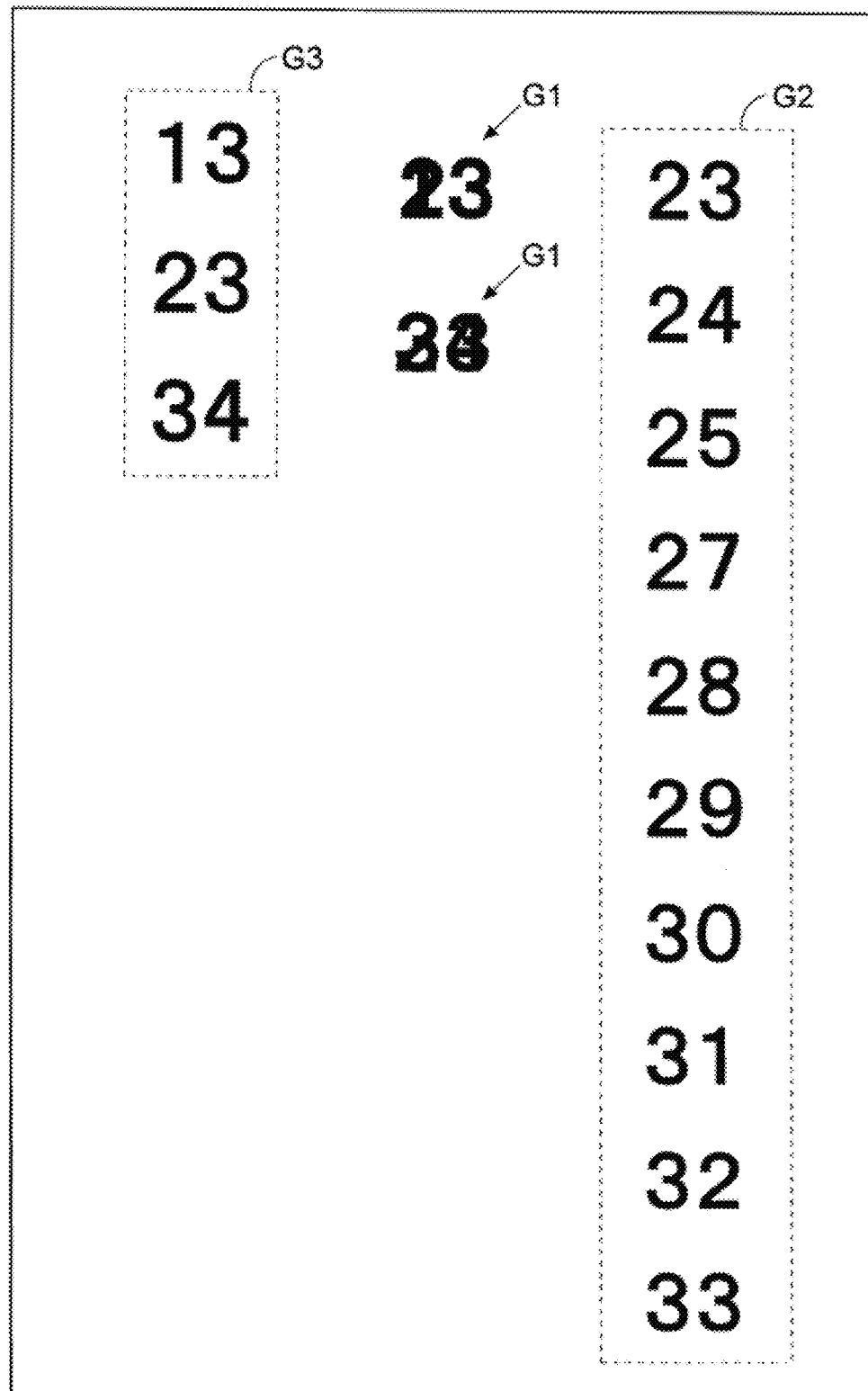
FIG. 11 is a diagram illustrating a confirmation page generated in the page number confirmation process performed by the control unit of the multifunction peripheral according to an embodiment of the present disclosure.

In this example, data of a confirmation page as illustrated in FIG. 11 is generated. In the confirmation page illustrated in FIG. 11, a plurality of pieces of image data with the reference numerals G1 are combined image data. Image data with the reference numeral G2 is confirmation image data.

As illustrated in FIG. 11, basic image data G3 in which image data in a specific area extracted from the document image data of the reference document D is arranged in a row in the reading order may be generated and the basic image data G3 may be included into the confirmation page.

Here, the control unit 5 performs a color conversion process of providing a different color to the difference area and to an area other than the difference area in the combined image data included into the confirmation page. For example, the control unit 5 provides a darker color to the difference area than an area other than the difference area. The color conversion process may be omitted.

Returning to FIG. 5, after the process of step S9, the control unit 5 performs a process of outputting the confirmation page in step S10. A method of outputting the confirmation page is not particularly limited. Any method of outputting the confirmation page can be set by a user. The operation panel 4 receives a setting related to the method of outputting the confirmation page from a user. For example, the confirmation page may be printed or the confirmation page may be displayed.

If a setting for printing out the confirmation page is made, the control unit 5 generates print image data, based on the data of the confirmation page, and causes the print unit 3 to print an image based on the print image data onto the sheet S. If a setting for displaying the confirmation page is made, the control unit 5 generates display image data, based on the data of the confirmation page, and causes the operation panel 4 to perform display based on the display image data. In this configuration, the print unit 3 and the operation panel 4 each correspond to an "output unit".

In the configuration of the present embodiment, if a job to be executed is a job accompanying fed reading, the confirmation page (see FIG. 11) is output when the page number confirmation function is enabled. The confirmation page may be printed onto the sheet S or displayed on the operation panel 4. By confirming the confirmation page, the user can easily know whether the reading of the document D is completed normally (whether a page missing occurs).

For example, it is assumed that a job accompanying fed reading is executed in a state where a plurality of documents D with the page numbers "23", "24", "25", "26", "27", "28", "29", "30", "31", "32", "33", and "34" are set to the document conveyance unit 2 in the order of the page numbers. It is assumed that the document D with the page number "26" (hereinafter, referred to by reference numeral D26) is conveyed in an overlapping manner with the document D with the page number "25" (hereinafter, referred to by reference numeral D25), that is, the document D26 is not read.

Here, it is assumed that the document D with the page number "23" (hereinafter, referred to by reference numeral D23) is set to the reference document D. If the document D23 is the reference document D and multi feeding in which the document D26 overlaps with the document D25 occurs, the document D with the page number "34" (hereinafter, referred to by reference numeral D34) has a reading order later than the document D23 by the extraction interval number (=10), and thus, the document D34 is the comparative document D.

In this case, a confirmation page including the combined image data illustrated in the right figure of FIG. 9 is output. That is, a confirmation page including an image in which the page number image corresponding to the page number added to the document D23 and the page number image corresponding to the page number added to the document D34 overlap is output.

Here, if multi feeding does not occur in a period from the reading of the document D23 to the reading of the document D34, the document D with the page number "33" (hereinafter, referred to by reference numeral D33) has a reading order later than the document D23 by the extraction interval number (=10), and thus, the document D33 is the comparative document D. In the combined image data (not illustrated) generated in this case, an image in which the page number image corresponding to the page number "23" added to the document D23 and a page number image corresponding to the page number "33" added to the document D33 overlap appears.

Images of the ones digits of the page number image corresponding to the page number "23" and the page number image corresponding to the page number "33" are the same. On the other hand, images of the tens digits of the page number image corresponding to the page number "23" and the page number image corresponding to the page number "33" are different from each other. Therefore, when the images in the combined image data based on the documents D23 and D33 are confirmed, the ones digit is easily discriminated, but it is difficult to discriminate the tens digits.

On the other hand, if multi feeding in which the document D26 overlaps with the document D25 occurs, an image in which the page number image corresponding to the page number "23" added to the document D23 and the page number image corresponding to the page number "34" added to the document D34 overlap appears in the combined image data (see FIG. 9) Images of the tens digits of the page number image corresponding to the page number "23" and the page number image corresponding to the page number "34" are different from each other. Further, images of the ones digits of the page number image corresponding to the page number "23" and the page number image corresponding to the page number "34" are also different from each other. Therefore, when the image in the combined image data based on the documents D23 and D34 is confirmed, it is difficult to discriminate both the ones digits and the tens digits.

As described above, if multi feeding does not occur, it is only difficult to discriminate the image corresponding to the tens digit from among the images in the combined image data included in the confirmation page. If multi feeding occurs, in addition to the image corresponding to the tens digit, it is also difficult to discriminate the image corresponding to the ones digit from among the images in the combined image data included in the confirmation page. That is, if multi feeding occurs, an image (an undecipherable image) having difficulty to be discriminated appears at a plurality of places in the same combined image data. Thus, by confirming the confirmation page, it is possible to easily determine whether multi feeding occurs.

Figure 12:
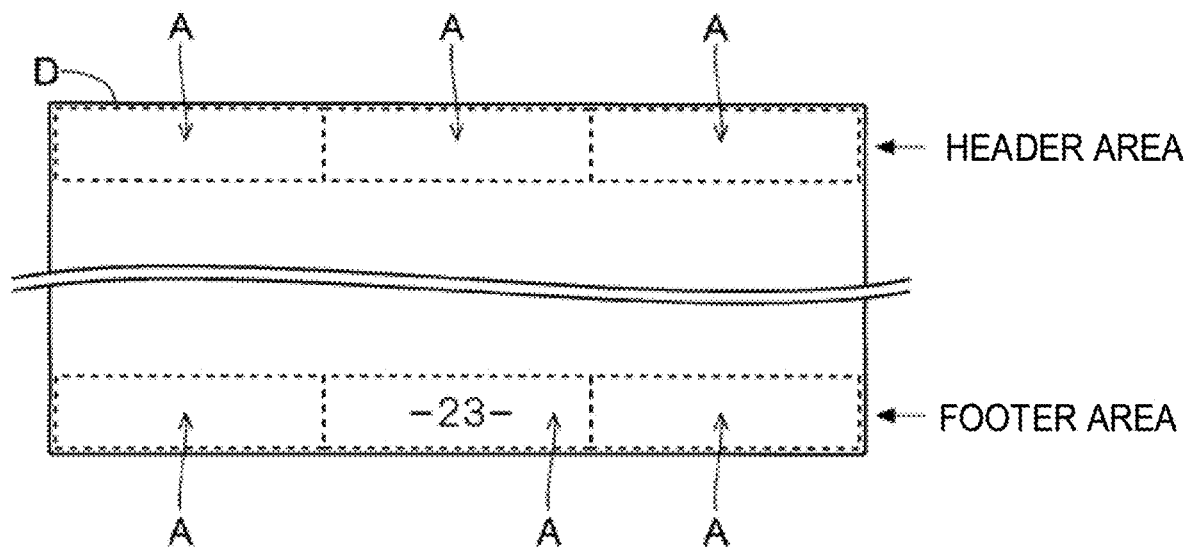
FIG. 12 is a diagram illustrating a header area and a footer area of a document to be read by the multifunction peripheral according to an embodiment of the present disclosure.

In some cases, as illustrated in FIG. 12, a page number including a number and a symbol (for example, a hyphen) is added to the document D. In this case, if multi feeding in which the document D26 is conveyed in an overlapping manner with the document D25 occurs, combined image data as illustrated in FIG. 13 is generated.

Figure 13:
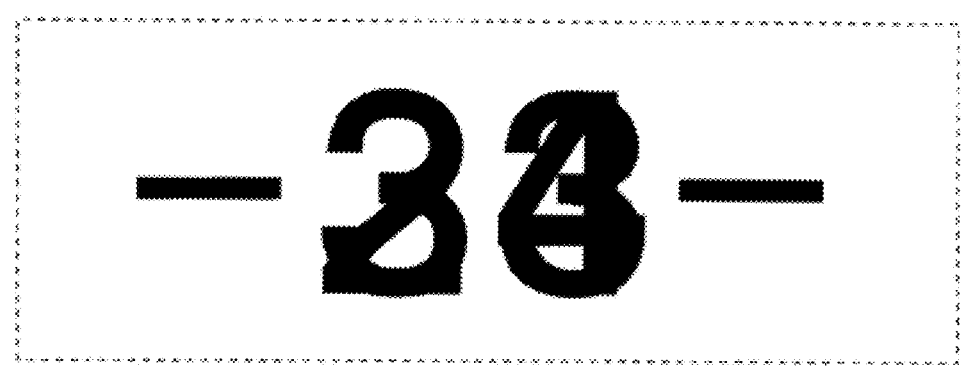
FIG. 13 is a diagram for describing combined image data generated in the page number confirmation process performed by the control unit of the multifunction peripheral according to an embodiment of the present disclosure.

As illustrated in FIG. 13, even if the page number added to the document D contains a hyphen, it is difficult to discriminate the image at a plurality of places in the combined image data when multi feeding occurs. Although not illustrated, if multi feeding does not occur, it is difficult to discriminate the image at one place in the combined image data. Thus, even if the page number added to the document D contains a hyphen, it is possible to determine whether multi feeding occurs.

Further, in the present embodiment, the control unit 5 provides a different color to the difference area and to an area other than the difference area in the combined image data included into the confirmation page. This makes it easy to determine whether the combined image data includes a difference area (whether multi feeding occurs).

Further, in the present embodiment, if the combined image data includes a plurality of black pixel areas in which the number of pixels in the difference area is equal to or greater than a prescribed threshold value, the control unit 5 determines that multi feeding occurs in a period from the reading of the reference document D to the reading of the comparative document D. In this configuration, if multi feeding occurs, it is possible to notify a user of the occurrence of multi feeding.

Specifically, if determining that multi feeding occurs, the control unit 5 extracts image data in a specific area identified in the area identification process from each piece of document image data obtained in a period from the reading of the reference document D to the reading of the comparative document D, and generates confirmation image data in which the extracted image data in the specific area is arranged in a row in the reading order. Then, the control unit 5 performs control so that the confirmation image data is included into the confirmation page.

With this configuration, it is possible to easily discriminate the document D (a missing page) not read by the image reading unit 1. For example, in the example illustrated in FIG. 10, the page number image corresponding to the page number "26" is missing, and thus, it is possible to easily discriminate that the document D with the page number "26" is not read.

The embodiments disclosed here are examples in all aspects and should not be considered to be limiting. The scope of the present disclosure is not indicated by the description of the above embodiment, but by the claims, and further includes all modifications within the meaning and scope equivalent to the claims.

What is claimed is:

1. An image forming apparatus comprising:
   a document conveyance unit configured to sequentially convey a document being set toward a reading position, the document including a plurality of the documents;
   an image reading unit configured to sequentially read the document conveyed to the reading position;
   a control unit configured to sequentially acquire document image data obtained as a result of which the image reading unit reads the document, and perform an area identification process for identifying, from among a plurality of specific areas in the acquired document image data, a specific area of the plurality of specific areas including an image corresponding to a page number added to the document; and
   an output unit, wherein
   the control unit
   sets any one of the documents to a reference document, extracts, as reference image data, image data in the specific area identified in the area identification process from among a plurality of the specific areas in the document image data of the reference document, extracts, as comparative image data, image data in the specific area identified in the area identification process from among a plurality of the specific areas in the document image data of a comparative document being the document having a reading order in which the image reading unit reads the document, later than the reference document by a prescribed extraction interval number, generates data of a confirmation page including a combined image in which the image corresponding to the page number of the reference document and the image corresponding to the page number of the comparative document are superimposed, and causes the output unit to output the confirmation page, and the extraction interval number is a prescribed integer multiple of 10.

2. The image forming apparatus according to claim 1, wherein the control unit recognizes, as a difference area, an area in combined image data corresponding to an area in which an absolute value of a difference in pixel value between the reference image data and the comparative image data is equal to or greater than a specific value, and provides a different color to the difference area and to an area other than the difference area in the combined image data.

3. The image forming apparatus according to claim 1, wherein the control unit recognizes, as a difference area, an area in combined image data corresponding to an area in which an absolute value of a difference in pixel value between the reference image data and the comparative image data is equal to or greater than a specific value, detects a black pixel area formed by a group of black pixels, from the combined image data obtained by being binarized, the black pixel area including a plurality of the black pixel areas, counts a number of pixels in the difference area in the black pixel area for each of the plurality of black pixel areas, and determines, if the combined image data includes a plurality of the black pixel areas in which the number of pixels in the difference area is equal to or greater than a prescribed threshold value, that multi feeding, in which a plurality of the documents are conveyed in an overlapping manner, occurs in a period from a reading of the reference document to a reading of the comparative document.

4. The image forming apparatus according to claim 3, wherein if it is determined that the multi feeding occurs, the control unit extracts image data in the specific area identified in the area identification process from each piece of the document image data obtained in the period from the reading of the reference document to the reading of the comparative document, generates confirmation image data in which the image data in the specific area extracted from each piece of the document image data obtained in the period from the reading of the reference document to the reading of the comparative document is arranged, and performs control so that the confirmation image data is included into the confirmation page.

5. An image forming apparatus comprising:

a document conveyance unit configured to sequentially convey a document being set toward a reading position, the document including a plurality of the documents;

an image reading unit configured to sequentially read the document conveyed to the reading position;

a control unit configured to sequentially acquire document image data obtained as a result of which the image reading unit reads the document, and perform an area identification process for identifying, from among a plurality of specific areas in the acquired document image data, a specific area of the plurality of specific areas including an image corresponding to a page number added to the document; and an output unit, wherein the control unit sets any one of the documents to a reference document, extracts, as reference image data, image data in the specific area identified in the area identification process from among a plurality of the specific areas in the document image data of the reference document, extracts, as comparative image data, image data in the specific area identified in the area identification process from among a plurality of the specific areas in the document image data of a comparative document being the document having a reading order in which the image reading unit reads the document, later than the reference document by a prescribed extraction interval number, generates data of a confirmation page including combined image data in which the reference image data and the comparative image data overlap, causes the output unit to output the confirmation page, recognizes, as a difference area, an area in the combined image data corresponding to an area in which an absolute value of a difference in pixel value between the reference image data and the comparative image data is equal to or greater than a specific value, and provides a different color to the difference area and to an area other than the difference area in the combined image data, and the extraction interval number is a prescribed integer multiple of 10.

* * * * *